(12) United States Patent
Kang et al.

(10) Patent No.: US 7,359,588 B2
(45) Date of Patent: Apr. 15, 2008

(54) ELECTROABSORPTION MODULATOR AND METHOD OF MANUFACTURING THE SAME

(75) Inventors: Young Shik Kang, Daejeon (KR); Jeha Kim, Daejeon (KR); Yong Hwan Kwon, Daejeon (KR); Yong Duck Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 344 days.

(21) Appl. No.: 11/302,538

(22) Filed: Dec. 14, 2005

(65) Prior Publication Data

US 2006/0126987 A1    Jun. 15, 2006

(30) Foreign Application Priority Data

Dec. 14, 2004  (KR) ............... 10-2004-0105699

(51) Int. Cl.
*G02B 6/12*      (2006.01)
*H01L 21/00*    (2006.01)

(52) U.S. Cl. ............... 385/14; 385/1; 385/2; 385/3; 385/43; 385/49; 385/130; 385/131; 385/27; 385/28; 438/29; 438/31

(58) Field of Classification Search ............ 385/1, 385/2, 3, 14, 24, 27, 28, 29, 31, 39, 40, 41, 385/42, 43, 129, 130, 131, 132, 49; 438/29, 438/31
See application file for complete search history.

(56) References Cited

U.S. PATENT DOCUMENTS 6,240,233 B1    5/2001    Weinert et al. ........... 385/131
6,558,048 B2    5/2003    Kuhara et al.
6,768,855 B1    7/2004    Bakke et al. ............ 385/129
2002/0097941 A1    7/2002    Forrest et al. ............ 385/1
2004/0120648 A1    6/2004    Kwon et al. ............. 385/43
2006/0228067 A1*   10/2006    Joyner et al. ............ 385/14
2007/0171515 A1*   7/2007    Kang et al. ............. 359/333

FOREIGN PATENT DOCUMENTS

JP    2005-043556    2/2005    ................. 385/1

OTHER PUBLICATIONS

Notice of Allowance for Korean App. 10-2004-0105699.
Yuling Zhuang et al; "Peripheral-Coupled-Waveguide MQW Electroabsorption Modulator for Near Transparency and High Spurious Free Dynamic Range RF Fiber-Optic Link"; IEEE Photonics Technology Letters, vol. 16, No. 9; Sep. 2004; pp. 2033-2035.

(Continued)

*Primary Examiner*—Brian M. Healy
(74) *Attorney, Agent, or Firm*—Lowe Hauptman Ham & Berner, LLP

(57) ABSTRACT

Provided is a double waveguide electroabsorption modulator, in which two spot size converters are integrated between first and second optical waveguides, thereby reducing an insertion loss between an optical fiber and an optical modulator while favorably operating even in high input optical power. Therefore, the electroabsorption modulator can stably operate in higher input optical power while reducing an optical coupling loss and an optical confinement factor (OCF).

15 Claims, 7 Drawing Sheets

OTHER PUBLICATIONS

J.E. Johnson et al; "Monolithically Integrated Semiconductor Optical Amplifier and Electroabsorption Modulator with Dual-Waveguide Spot-Size Converter Input"; IEEE Journal of Selected Topics in Quantum Electronics, vol. 6, No. 1; Jan. 2000; pp. 19-25.

Hiromi Oohashi et al.; "Reliability of 1300-nm Spot-Size Converter Integrated Laser Diodes for Low-Cost Optical Modules in Access Networks"; Journal of Lightwave Technology, vol. 16, No. 7; Jul. 1998; pp. 1302-1307.

* cited by examiner

ELECTROABSORPTION MODULATOR AND METHOD OF MANUFACTURING THE SAME

CROSS-REFERENCE TO RELATED APPLICATION

This application claims priority to and the benefit of Korean Patent Application No. 2004-105699, filed Dec. 14, 2004, the disclosure of which is incorporated herein by reference in its entirety.

BACKGROUND

1. Field of the Invention

The present invention relates to an electroabsorption modulator, and more specifically, to an electroabsorption modulator appropriate for analog optical communication in which an optical waveguide and an spot size converter are integrated with each other to reduce an insertion loss between an optical fiber and an optical modulator and to favorably operate in high input optical power, and a method of manufacturing the same.

2. Discussion of Related Art

In general, an electroabsorption modulator used for modulating signals in digital optical communication serves to adjust an intensity of output light according to an electrical signal input by interrupting an intensity of incident light (referred to as intensity modulation (IM)). Here, the modulated digital signal is simply classified into a signal having a larger intensity than a certain criterion (state '1', off state) and another signal (state '0', on state). In digital communication, an 'extinction ratio' is defined as a unit of intensity, with which on and off states can be distinguished. The extinction ratio varies according to the ability to absorb light with an optical modulator. A multi-quantum well optical modulator typically has an extinction ratio of about 20 dB. In addition to the extinction ratio, as the optical intensity increases, an optical signal to noise ratio (OSNR) in the digital communication grows larger, leading to performance improvement of the system. Therefore, there is a critical need for a digital optical modulator to operate in high input optical power with a large extinction ratio.

In analog optical transmission, an output of light intensity matching to an electrical signal having a certain frequency is modulated and transmitted through an optical fiber, and then an electrical signal is recovered from the optical signal. An optical modulator for use in the analog optical transmission is employed as an essential signal source of a radio-over-fiber (ROF) link optical transmission technology that converts an RF signal carrying a digital modulated signal, such as BPSK, QPSK, and QAM, into an optical signal for transmitting through the optical fiber. In this case, a ratio of an RF signal input to the optical modulator to an RF signal recovered by an optical detector is defined as an RF gain. Further, making the RF gain large is very important in the ROF link optical transmission. From the viewpoint of the optical modulator, the RF gain is proportional to the square of output optical power, and to the slope of a transfer function of the modulator. Therefore, not only the analog optical modulator is required to operate in high input optical power but also the slope of its transfer function should be steep.

In the recent digital or analog communication, the operating speed tends to gradually increase. Further, the operating speed of an electroabsorption modulator is inversely proportional to the capacitance of a device. Therefore, the device size of an optical modulator should be reduced in order to acquire an optical modulator having a fast operating speed, which leads to a reduction in the extinction ratio. Consequently, there is a limit in the speed of the electroabsorption modulator that maintains a certain extinction ratio.

To overcome this limit, a traveling wave electroabsorption modulator was introduced. Theoretically, the traveling wave electroabsorption modulator, which is configured such that light is modulated while an electrical signal and an optical signal propagate at the same speed, is not affected by capacitance of the device. Therefore, an optical modulator having a high operating speed while maintaining a large extinction ratio can be manufactured.

The most key factor in the traveling wave electroabsorption modulator is to uniformly distribute electrical signals and optical signals all over the optical waveguide. In a typical multi-quantum well electroabsorption modulator, an optical confinement factor (OCF) is about 20 to 30%. Here, when a voltage is applied, most incident light is absorbed in a front portion of the device and the absorbed light is split into an electron and a hole, which move to p and n electrodes, respectively. In this case, when light having large intensity is incident, a phenomenon occurs that a very large current is generated at the front portion of the device to break down the device. Likewise, a typical optical modulator having a high OCF to increase optical modulation efficiency cannot operate properly when light having large intensity is input, and, from the viewpoint of the traveling wave optical modulator, the electrical signals are distributed along the optical waveguide while the optical signals are absorbed in the front portion, thus resulting in a negligible difference from a lumped device. Therefore, in order to manufacture a traveling wave electroabsorption modulator that operates in incident light having large intensity, it is important to allow the incident light to be absorbed throughout the waveguide, which is directed to design of an epi-structure having a low OCF.

An optical insertion loss of the typical multi-quantum well electroabsorption modulator is about 10 dB. Here, the loss of about 1 dB is resulted from the multi-quantum well absorption layer and the loss of about 9 dB is attributed to an optical coupling loss with an optical fiber. As described above, the intensity of output light power plays a critical role in performance improvement of the communications in digital and analog communications. Therefore, an optical modulator should be designed to reduce an insertion loss and operate in high input light power.

Most insertion loss is caused by the optical coupling loss with the optical fiber, which is generated from inconsistency of an optical mode between the semiconductor optical device and the optical fiber. The optical mode of the semiconductor optical device is an ellipse with a large diameter of 1 µm, while the optical mode of the optical fiber is a circle with a diameter of about 10 µm. Therefore, in optical coupling between the semiconductor optical device and the optical fiber, a very large loss is unavoidable due to the mismatch of the optical mode size. Thus, one method of reducing the optical coupling loss is to make a shape of the optical mode of the semiconductor optical device close to be circular.

Yuichi Tohmor discloses a method of manufacturing a conventional laser diode integrated with an spot size converter in "Reliability of 1300-nm Spot-Size Converter Integrated Laser Diodes for Low-Cost Optical Modules in Access Network", (Journal of lightwave technology, Vol. 16 No. 7, pp 1302-1307, 1998). An active portion of the laser diode is removed by etching a place where an spot size converter is to be inserted. Next, using a SAG method, a passive optical waveguide is butt coupled to have an arrangement that the thickness of the passive optical waveguide is reduced from a butt coupling interface, resulting in a thickness of within 0.2 μm at the end.

This arrangement has problems in that the epitaxial regrowth is required in the SAG method, and that the SAG method itself applies a stress to a semiconductor crystal. Thus, there is a problem in that the growth conditions are complicated and should be strictly regulated.

J. E. Johnson discloses a device which is integrated with an electroabsorption modulator, an optical amplifier, and an spot size converter, in "Monolithically Integrated Semiconductor Optical Amplifier and Electroabsorption Modulator with Dual-Waveguide Spot-Size Converter Input" (Journal of selected topics in quantum electronic, Vol. 6, No. 1, pp 19-25, 2000. 1). In this arrangement, a double waveguide structure is used in which the thickness of a passive optical waveguide becomes reduced using the SAG method as it goes to the end portion. Further, active layers for the optical amplifier and the optical modulator have a different bandgap from each other, so that each active layer is also grown using the SAG method. In addition, in order to move the optical mode from an active waveguide of the optical amplifier to the passive waveguide, the active waveguide of the optical amplifier is tapered in the lateral direction. However, this method has also drawbacks in that the manufacture process is complicated by the use of the SAG method.

Yuling Zhuan discloses a multi-quantum well electroabsorption modulator in "Peripheral Coupled Waveguide MQW Electroabsorption Modulator for Near Transparency and High Spurious Free Dynamic Range RF (Fiber-Optic-Link, Photonics technology Letter, Vol. 16 No. 9, pp 2033-2035, pp 2004. 9).

The OCF in the absorption layer located at the multi-quantum well should be small to operate in the high input optical power. In this arrangement, the OCF of the absorption layer located at the multi-quantum well is significantly low, i.e., 5% in the arrangement. Therefore, even with very high input optical power, an amount of optical current generated by input light absorption in the absorption layer is substantially very low. On the other hand, by making the size of the optical mode large, optical coupling efficiency with an optical fiber can be increased.

However, this technology is inappropriate to the digital optical communication, because most of the optical modes exist below the absorption layer and thus a sufficient extinction ratio cannot be obtained. Further, although the size of the optical mode is increased, the shape is still elliptical, resulting in an optical coupling loss with the circular optical fiber.

As described, the prior art uses a SAG method or a peripheral coupled waveguide (PCW) arrangement to manufacture a semiconductor optical device that operate in high input optical power with high optical coupling efficiency with the optical fiber.

However, there are drawbacks in that the SAG method has a complicated manufacturing process, strict processing conditions, and is difficult to manufacture, and that the PCW structure cannot have a sufficient extinction ratio.

SUMMARY OF THE INVENTION

The present invention is directed to an electroabsorption modulator which has a low optical coupling loss with an optical fiber and is operable in a relatively high input optical power.

One aspect of the present invention is to provide a double waveguide type electroabsorption modulator including: a first optical waveguide in which light is modulated and a second optical waveguide that facilitates optical coupling with an optical fiber; and first and second spot size converters located between the first and second optical waveguides for changing and moving the optical mode, wherein an optical confinement factor is adjusted according to a thickness of the second spot size converter.

The second spot size converter may have the same width as the first spot size converter or a width larger than the first spot size converter by 3 μm or less.

Another aspect of the present invention is to provide A method of manufacturing a double waveguide type electroabsorption modulator, including: forming, in a stacked structure, a first spot size converter having a first semiconductor layer and a second spot size converter having a second semiconductor layer; forming a first spot size converter having an acute angle by etching using first and second mask layers as a mask, in which some portions overlap on the first semiconductor layer; and forming a second spot size converter having an acute angle by etching using third and fourth mask layers as a mask, in which some portions overlap on the second semiconductor layer.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

The present invention will now be described more fully hereinafter with reference to FIGS. 1 to 6, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

(Electroabsorption Modulator)

Figure 1A:
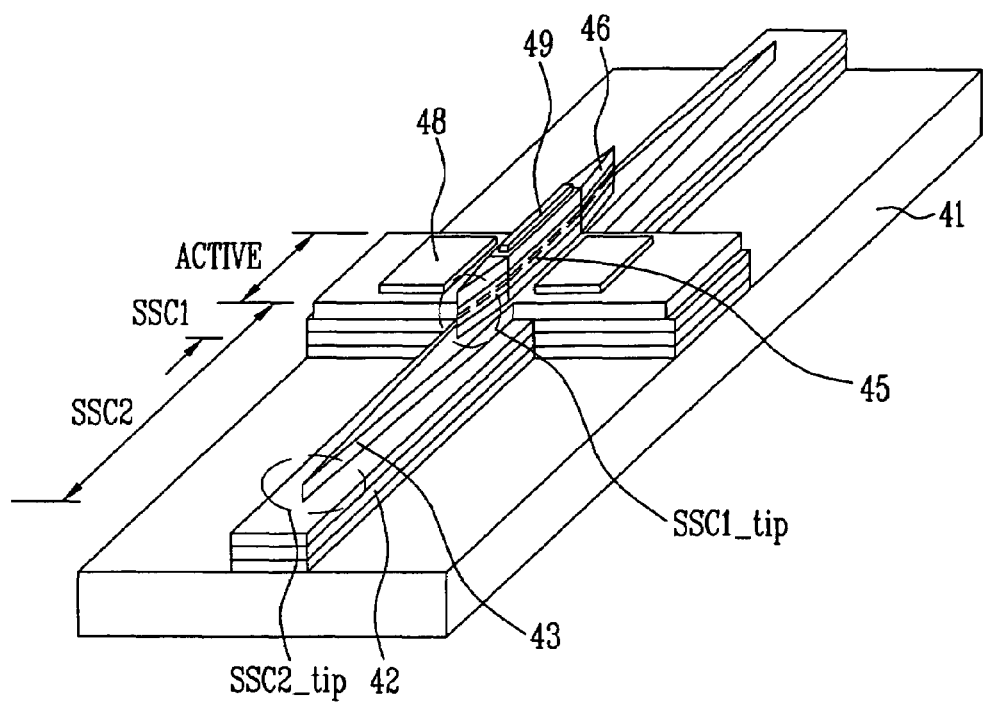
FIG. 1A is a perspective view of an spot size converter integrated electroabsorption modulator according to an embodiment of the present invention.
Figure 1B:
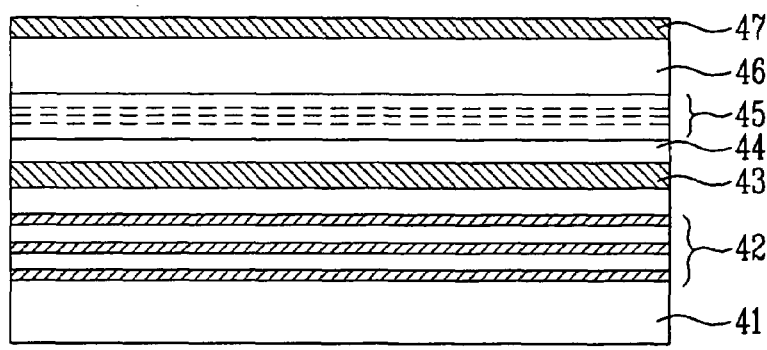
FIG. 1B is a schematic cross-sectional view of FIG. 1A.

FIG. 1A is a perspective view of an spot size converter integrated electroabsorption modulator according to an embodiment of the present invention, and FIG. 1B is a schematic cross-sectional view of FIG. 1A.

Referring to FIG. 1A, a double waveguide electroabsorption modulator includes first and second optical waveguides 45 and 42, and first and second spot size converters SSC1 and SSC2 located therebetween for changing and moving an optical mode. An optical confinement factor is adjusted according to the thickness of the second spot size converter SSC2.

More specifically, the second optical waveguide 42 makes optical coupling with an optical fiber more efficient, the first spot size converter SSC1 changes and moves an optical mode from the first optical waveguide 45 to the second spot size converter SSC2, and the second spot size converter SSC2 changes and moves an optical mode from the second optical waveguide 42 to the first optical waveguide 45.

Examples of each layer that can be used in a stacked structure shown in FIG. 1B are illustrated as follows. The stacked structure of FIG. 1B includes a semi-dielectric InP substrate 41, a spacer layer 44 that facilitates optical mode movement with a suitable gap in a growth direction between the first optical waveguide 45 and the second spot size converter SSC2, and a p-type InP cladding layer 46. The second optical waveguide 42 may include an intrinsic InGaAsP-based multi-layer.

Further, the first optical waveguide 45 may include a multi-quantum well in which light is modulated. The multi-quantum well included in the first optical waveguide 45 may apply a compressive strain to a well layer, and a tensile strain to a barrier layer to reduce a hole screening effect.

The second optical waveguide 42 has a high refractive index layer and a low refractive index layer alternatively grown, and thus is defined as a ridge type. Here, the period of the high refractive index layer and the low refractive index layer can be increased or reduced, and preferably, 2 to 4. In other words, while the period is 3 in the present embodiment, it will be appreciated that the period is not limited thereto. In addition, the second optical waveguide 42 is a ridge type, having a width of 3 µm to 6 µm, and a thickness of 2 µm to 5 µm.

Figure 2A:
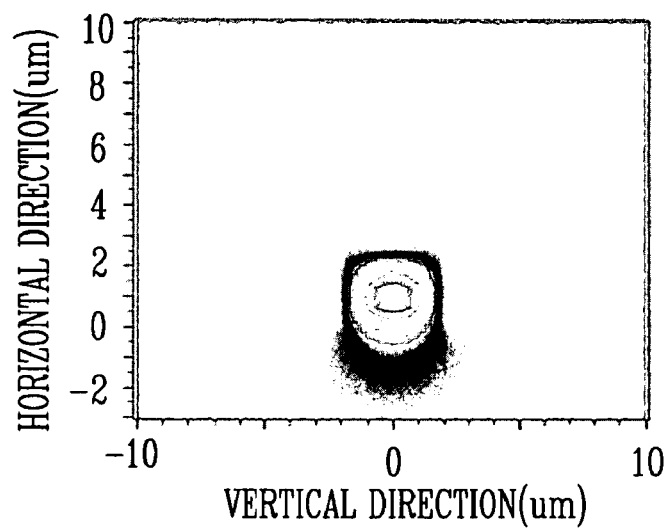
FIG. 2A is a diagram showing a simulation result of an optical mode shape for a second optical waveguide of FIG. 1A.
Figure 2B:
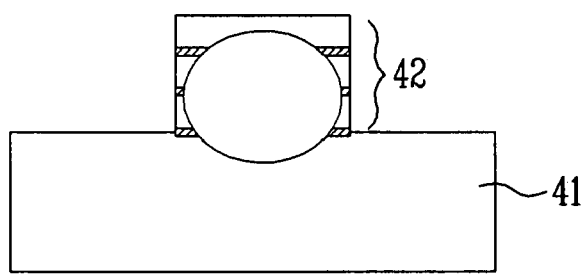
FIG. 2B is a conceptual diagram of an optical mode for the second optical waveguide of FIG. 1A.
Figure 2C:
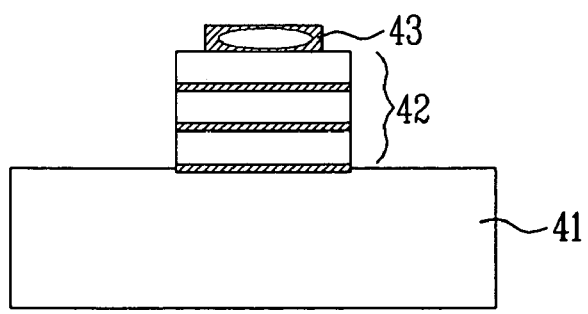
FIG. 2C is a conceptual diagram of an optical mode for the second spot size converter of FIG. 1A.

FIG. 2A is a diagram showing a simulation result of an optical mode shape for a second optical waveguide of FIG. 1A; FIG. 2B is a conceptual diagram of an optical mode for the second optical waveguide of FIG. 1A; and FIG. 2C is a conceptual diagram of an optical mode for the second spot size converter of FIG. 1A.

It will be appreciated that an optical mode of the second optical waveguide 42 calculated in FIG. 2A is circular-like, and the optical mode of the second optical waveguide 42 in the ridge type is circular-like (FIG. 2B). FIG. 2C shows an optical mode guided from the second spot size converter SSC2. In this case, the optical mode is elliptical-like. The circular-like optical mode can maximize optical coupling efficiency with a tapered optical fiber.

Figure 3A:
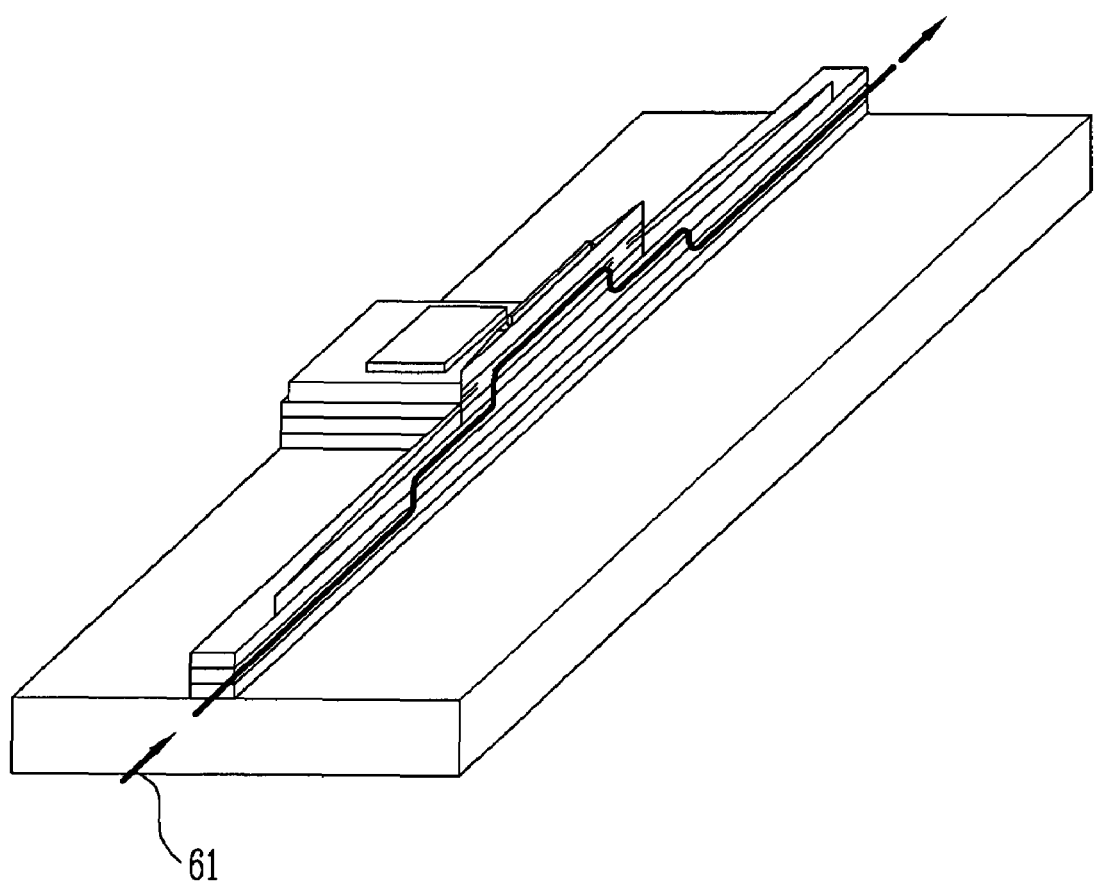
FIG. 3A is a conceptual diagram for explaining each waveguide path of an optical modulator, along which light incident from the outside propagates in the optical modulator of FIG. 1A.

A path along which light incident from the outside propagates is now illustrated with reference to FIGS. 1A and 3A. FIG. 3A is a conceptual diagram for explaining each waveguide path of an optical modulator, along which light incident from the outside propagates in the optical modulator of FIG. 1A.

Referring to FIGS. 1A and 3A, incident light 61 from an optical fiber propagates while optically coupled to the second optical waveguide 42, and the optical mode is changed and moved by the second spot size converter SSC2. Next, while light propagates a point that meets the first optical waveguide 45, the optical mode is changed and moved by the first spot size converter SSC1 to thus modulate light in the first optical waveguide. Then, the optical mode is changed and moved again from the first optical waveguide 45 to the second optical waveguide 42 by the first and second spot size converters SSC1 and SSC2, and the light is finally coupled to the optical fiber.

Figure 3B:
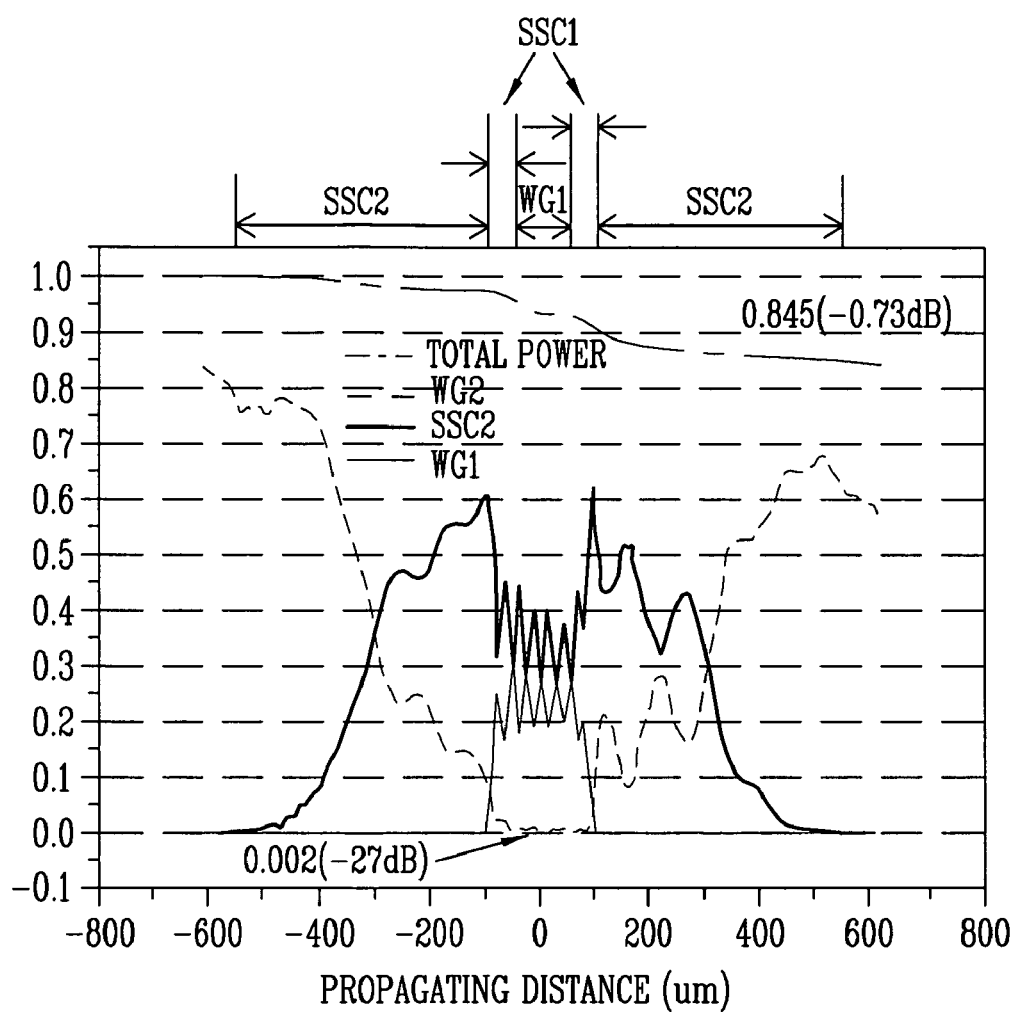
FIG. 3B is a diagram showing an optical power and a total optical loss in each waveguide along a direction of propagating light in the optical modulator of FIG. 3A.

In order to change and move the optical mode from the first optical waveguide 45 to the second optical waveguide 42 without loss, design of the first and second spot size converters SSC1 and SSC2 should be desirably performed. A waveguide width of the optical modulator is typically more or less 2 µm. The power of incident light propagating through the second optical waveguide 42, the second spot size converter SSC2, the first spot size converter SSC1, the first optical waveguide 45, the first spot size converter SSC1, the second spot size converter SSC2 and the second optical waveguide 42 is shown in FIG. 3B. In this case, it will be appreciated that the total power of the incident light is changed and moved without loss (which will be described below).

Therefore, for the first spot size converter SSC1 connected to the first optical waveguide, it is desirable that a width of start from 2 µm, and a width at the tip portion SSC1_tip be less than 0.5 µm. In addition, for the second optical waveguide SSC2, it is desirable that a width at the start portion be 3 to 4 µm and a width of the tip portion SSC2_tip be less than 0.7 µm. Here, the narrower the tips of the first and second spot size converters SSC1 and SSC2 are, the less loss is given in converting an optical mode. Thus, it is important to form a width of the tip portion to be small.

Further, FIG. 3B is a diagram showing an optical power and a total optical loss for each waveguide along a direction of propagating light in the optical modulator of FIG. 3A. FIG. 3B shows distribution of an optical power calculated in a beam propagation method (BPM). A line indicated as the total power refers to the total loss of the light incident on the optical modulator, i.e., loss generated by integrating the spot size converter, and a line indicated as WG2 refers to optical power distribution in the second optical waveguide, a line indicated as SSC2 refers to an optical power distributed in the second spot size converter, and a line indicated as WG1 refers to an optical power distributed in the first optical waveguide. As described above, it will be appreciated that the total power of the incident light can be changed and moved without loss in the arrangement.

As described above, in order to manufacture an optical modulator operable in large input light, an optical confinement factor (OCF) of the active layer should be reduced. Next, a way to reduce the OCF in the electroabsorption modulator according to the present embodiment is described. One way to reduce the OCF is to adjust a thickness of the second spot size converter.

The OCF, the extinction ratio (ER), and the total optical loss of the optical modulator according to a thickness of the second spot size converter will now be described in detail with reference to FIGS. 4A and 4B.

Figure 4A:
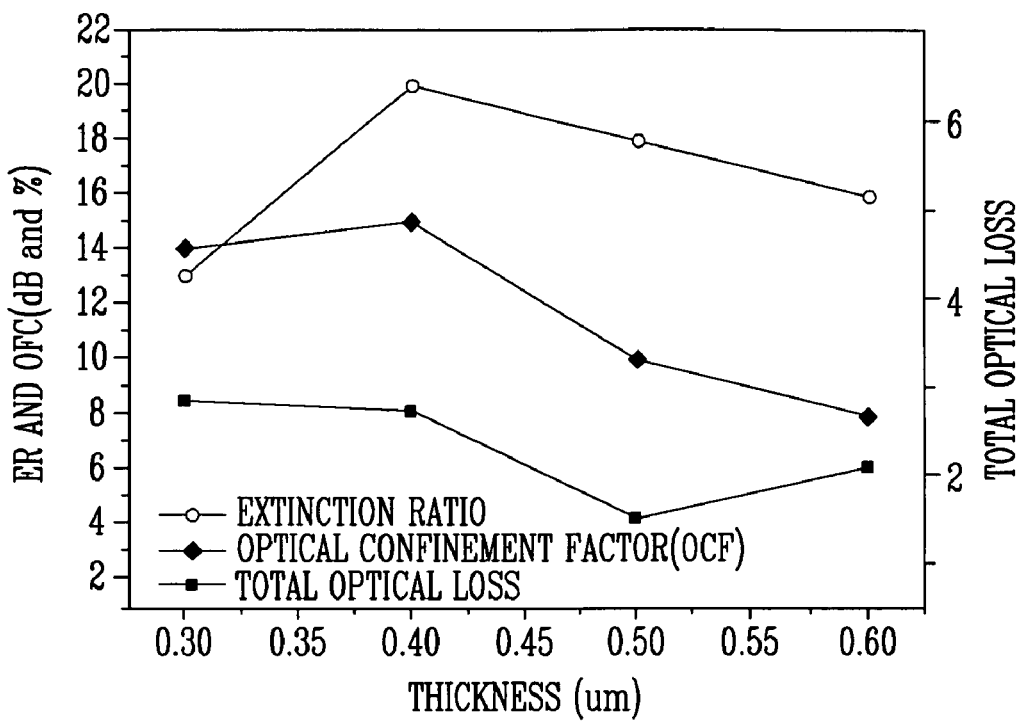
FIGS. 4A and 4B are graphs showing stimulation results of an electroabsorption modulator.
Figure 4B:
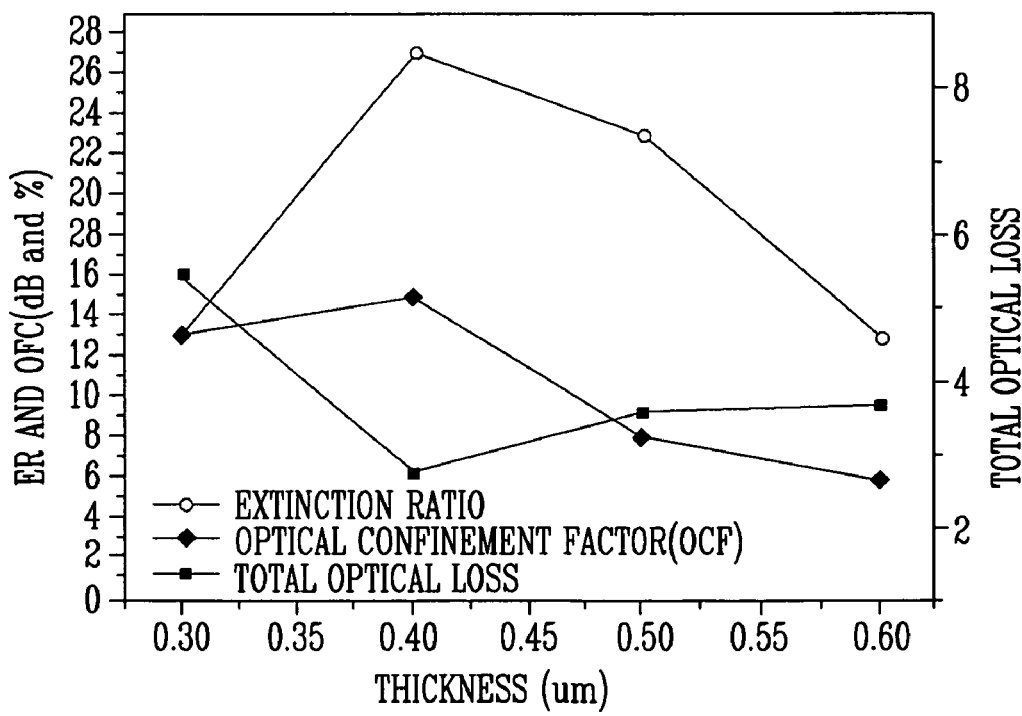

FIG. 4A is a graph showing stimulation results of an extinction ratio, an OCF, and the total optical loss (except for optical insertion loss) of the optical modulator according to a thickness of the second spot size converter using a BPM method under the first condition, and FIG. 4B is a graph showing stimulation results of an extinction ratio, an OCF, and the total optical loss (except for optical insertion loss) of the optical modulator according to a thickness of the second spot size converter under the second condition. The first condition has a width of second spot size converter changed from 4 µm to 0.5 µm, while the second condition has a width of the second spot size converter changed from 3 µm to 0.5 µm.

The total optical loss refers to an optical loss when an optical mode transits from the second optical waveguide to the first optical waveguide through the second and first spot size converters and the optical mode transits again to the second optical waveguide.

Referring to FIGS. 4A and 4B, it will be appreciated that the OCF is reduced as the second spot size converter becomes thicker. Considering that the OCF of the conventional electroabsorption modulator is 20% to 30%, it will be noted that the OCF is significantly reduced in the present embodiment. However, the thicker the second spot size converter, the less the movement of the optical power to the first optical waveguide from the second spot size converter, which results in a decrease of the extinction ratio and increase of the total optical loss.

Therefore, in order to determine an appropriate thickness of the second spot size converter, it is desirable that the extinction ratio, the total optical loss and the OCF of the optical modulator should be traded-off.

Figure 5:
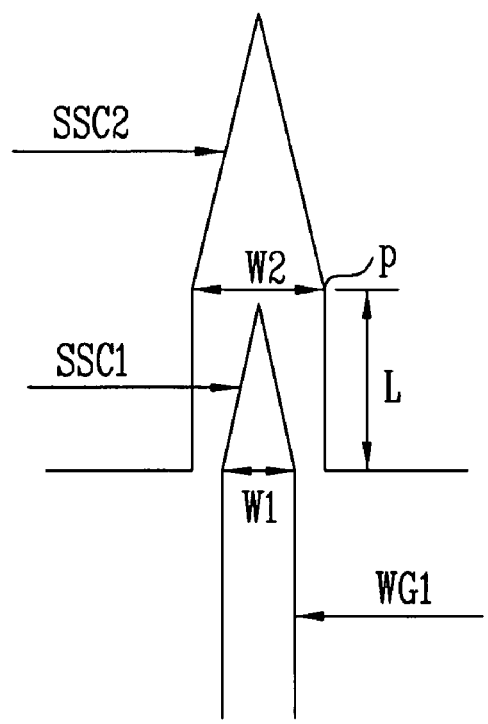
FIG. 5 is a plan view schematically showing an arrangement of a first optical waveguide, a first optical mode convert and a second spot size converter in an electroabsorption modulator according to an embodiment of the present invention.

FIG. 5 is a plan view showing an arrangement of a first optical waveguide, a first spot size converter and a second spot size converter in an electroabsorption modulator according to an embodiment of the present invention.

Referring to FIG. 5, the first optical waveguide WG1, the first and second spot size converters SSC1 and SSC2 are formed one after another. A width W2 and a position p where a taper starts, of the second spot size converter SSC2 significantly affect optical transmission from the first spot size converter SSC1 to the second spot size converter SSC2.

Therefore, as shown in FIG. 5, the second spot size converter SSC2 is preferably as wide as or wider than the first optical waveguide WG1, and more preferably wider by 1 µm to 3 µm for the processing convenience.

In addition, a taper start position P of the second spot size converter SSC2 is preferably an end portion of the first spot size converter SSC1. Therefore, the second spot size converter SSC2 is manufactured such that the same width is maintained from the end portion of the first optical waveguide WG1 (start portion of the first spot size converter) to the length of L while the width is reduced from the L to the tip width.

Manufacturing of Spot Size Converter

Figure 6A:
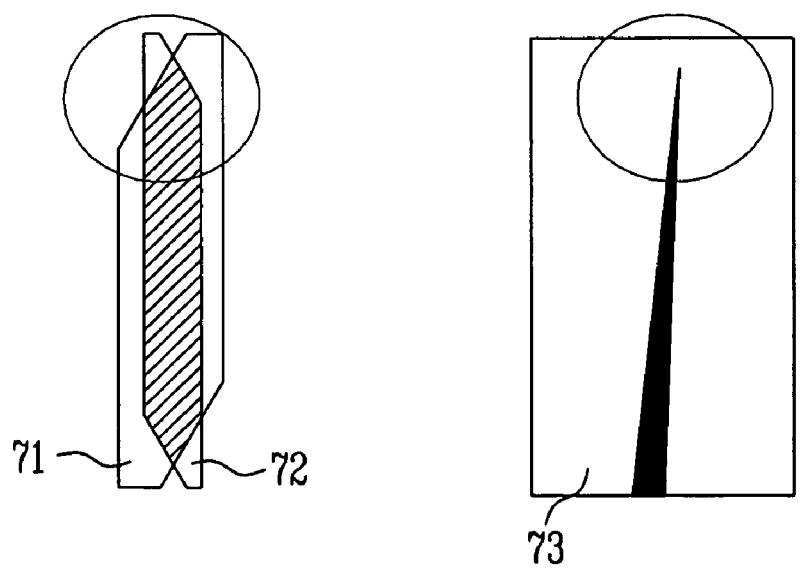
FIG. 6A is a diagram of a mask pattern that forms a tip of the spot size converter of FIG. 1A, and the tip formed by the mask pattern.
Figure 6B:
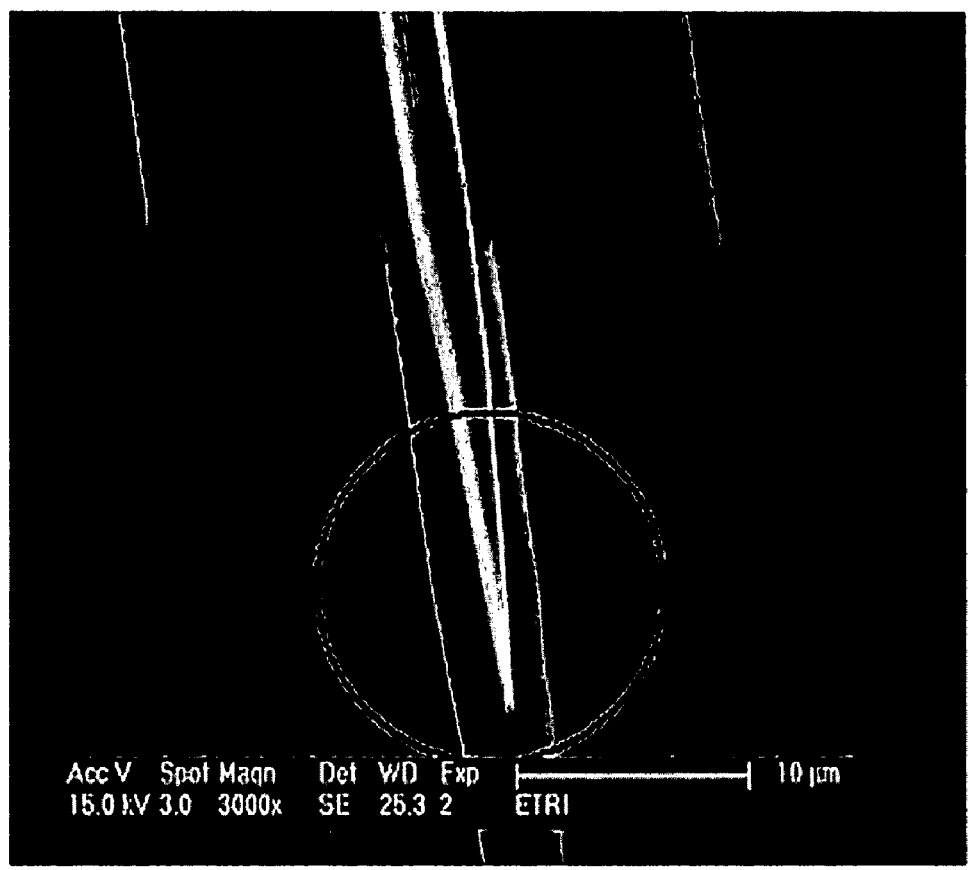
FIG. 6B is a SEM photograph of the tip of the spot size converter of FIG. 6A.

A method of manufacturing first and second spot size converters SSC1 and SSC2 according to the present embodiment is described below in detail. The first and second spot size converters SSC1 and SSC2 can be manufactured using both a reactive ion etching (RIE) process and a selective wet etching process. FIG. 6A is a diagram of a mask pattern that forms a tip of the spot size converter of FIG. 1A, and a tip formed by the mask pattern, and FIG. 6B is a SEM photograph of the tip of the spot size converter of FIG. 6A.

The first spot size converter SSC1 is manufactured in a tapered shape such that the width of the first optical waveguide 45 having a plurality of layers is, for example, less than 0.5 µm, so that a effective manufacturing method is required. In other words, although a selective wet etching process is required to etch to the exact depth, it is difficult to implement due to a variety of material compositions, and difficult to exactly adjust the etching depth using wet etching even when the etchant having the same etch rate irrespective of the material composition is used.

To address these problems, in the present embodiment, it may be manufactured such that 90% of the thickness of the first spot size converter (SSC1 of FIG. 1A) is etched through RIE, and the remaining 10% is etched using a selective wet etching process. More specifically, a spacer 44 of FIG. 1A, a lower region of the first spot size converter SSC1, and the second spot size converter SSC2 below and adjacent thereto are preferably made of a material having selectivity in a wet etching process.

The spacer 44 of FIG. 1A may be mad of, for example, InP, and a thickness thereof is preferably 0.2 µm to 0.4 µm. The second spot size converter SSC2 is made of InGaAsP series having about 1.24 µm bandgap, in which $H_2PO_4$ and $H_2O_2$ are properly mixed as a selective etchant. When etching is performed by the dry etching process as described above, the mask tip should be as small as less than 0.2 µm. However, when etching is performed by the wet etching process, even though the tip mask is wide a longer etching time to form under cut may allow the tip to be manufactured small. This will be described below in detail.

Referring to FIG. 6a, first, in a method of manufacturing the first spot size converter SSC1, a SiNx mask having an acute tip is formed on the substrate having an epi-structure shown in FIG. 1B, using the first and second masks 71 and 72, and then, etched to the spacer layer 44 of FIG. 1B using an RIE process. As described above, it is not easy to exactly adjust the etch height using the RIE process, so that etching is conducted with a target to the intermediate thickness of the spacer layer 44 of FIG. 1B. Here, the spacer layer of the remaining thickness 44 of FIG. 1B is etched to the second spot size converter layer 43 using a selective wet etching process.

A very acute SiNx mask can be formed as shown in FIG. 6A through photolithography using two photomasks 71 and 72. A region where the first and second photomasks 71 and 72 are overlapped becomes the resultant photoresist mask for forming the first spot size converter. While a SiN layer is used as a mask of the first spot size converter according to the present embodiment, it will be appreciated that the present invention is not limited thereto.

FIG. 6B is a SEM photograph of the first spot size converter substantially manufactured according to the present embodiment. It will be noted that a very acute tip of less than 0.2 µm is formed.

The second spot size converter, which is made of, for example, an n-type 1.24Q InGaAsP, forms an n-type electrode in the optical modulator while converting an optical mode. For the electroabsorption modulator having a traveling wave electrode, a thickness of the n-type electrode layer acts as a key parameter, and thus the thicker n-type electrode layer is beneficial in terms of the loss of the input electrical signal. However, with a large thickness, the optical mode is strongly confined to the second optical mode conversion layer, thus leading to a loss in changing and moving optical mode to the first or second optical waveguide. Therefore, a thickness of the second spot size converter is preferably 0.3 to 0.7 μm.

The tip of the second spot size converter may be formed either in the same manner as that of the tip of the first spot size converter, or by the selective wet etching process. Since the layer has a thickness of less than 0.7 μm and is made of the same material, the second spot size converter can be formed by the selective wet etching process for the processing sake. There should be selectivity in wet etching between the second spot size converter layer and the lower layer thereof, so that the second spot size converter is preferably made of an InGaAsP layer having a bandgap of about 1.24 μm and the lower layer thereof is made of InP. As the selective wet etchant, $H_2PO_4$ and $H_2O_2$ used for manufacturing the first spot size converter are properly mixed.

With the above-mentioned method, a first optical waveguide, a first spot size converter, a second optical waveguide, and a second spot size converter are manufactured. Through this, optical coupling efficiency with an optical fiber is maximized and insertion loss is reduced, thereby allowing an output optical power of the optical modulator to be increased.

An optical modulator including an double waveguide type spot size converter according to an embodiment of the present invention advantageously reduces optical insertion loss and operates in high input optical power.

In addition, the incident light is uniformly distributed throughout the optical waveguide to improve operational performance as a traveling wave optical modulator, thereby implementing a function as a very high-speed optical modulator with a large extinction ratio.

In addition, in the very high-speed digital optical communications, a large extinction ratio can be obtained while operating in high input optical power, so that OSNR can be increased. Moreover, an RF gain can be increased in very high-speed analog/digital optical communication.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. A double waveguide electroabsorption modulator comprising:
    a first optical waveguide in which light is modulated and a second optical waveguide that facilitates optical coupling with an optical fiber; and
    first and second spot size converters located between the first and second optical waveguides for changing and moving the optical mode,
    wherein an optical confinement factor is adjusted according to a thickness of the second spot size converter.

2. The double waveguide electroabsorption modulator according to claim 1, wherein the second optical waveguide is a ridge type, and has a width of 3 μm to 6 μm and a thickness of 0.2 μm to 0.5 μm.

3. The double waveguide electroabsorption modulator according to claim 1, wherein the second optical waveguide has a structure in which a high refractive index layer and a low refractive index layer are periodically stacked, and the period is 2 to 4.

4. The double waveguide electroabsorption modulator according to claim 1, wherein the second spot size converter has a thickness of 0.3 μm to 0.7 μm.

5. The double waveguide electroabsorption modulator according to claim 1, wherein the second spot size converter has an optical wavelength bandgap of 1.24 μm.

6. The double waveguide electroabsorption modulator according to claim 1, wherein the second spot size converter has the same width as the first spot size converter or a larger width than the first spot size converter by 3 μm or less.

7. The double waveguide electroabsorption modulator according to claim 6, wherein the second spot size converter starts from an end portion of the first optical waveguide, and is tapered from the end portion of the first spot size converter.

8. The double waveguide electroabsorption modulator according to claim 1, further comprising a spacer layer between the first and second spot size converters.

9. The double waveguide electroabsorption modulator according to claim 8, wherein the spacer layer is formed of InP and has a thickness of 0.2 μm to 0.4 μm.

10. A method of manufacturing a double waveguide electroabsorption modulator, comprising:
    forming, in a stacked structure, a first spot size converter having a first semiconductor layer and a second spot size converter having a second semiconductor layer;
    forming a first spot size converter having an acute angle by etching using first and second mask layers as a mask, in which some portions overlap on the first semiconductor layer; and
    forming a second spot size converter having an acute angle by etching using third and fourth mask layers as a mask, in which some portions overlap on the second semiconductor layer.

11. The method according to claim 10, wherein the first semiconductor layer is etched by a reactive ion etching method and a selective wet etching method.

12. The method according to claim 10, wherein the second semiconductor layer is etched using both a reactive ion etching method and a selective wet etching method, or using a selective wet etching method.

13. The method according to claim 11, wherein the selective wet etching method is performed using an etchant containing $H_2PO_4$ and $H_2O_2$.

14. The method according to claim 12, wherein the selective wet etching method is performed using an etchant containing $H_2PO_4$ and $H_2O_2$.

15. The method according to claim 10, wherein the stacked structure is an epi-structure.

* * * * *